(12) United States Patent
Sakamoto

(10) Patent No.: US 7,911,719 B2
(45) Date of Patent: Mar. 22, 2011

(54) ZOOM LENS

(75) Inventor: Takamasa Sakamoto, Osaka (JP)

(73) Assignee: Asia Optical Co., Inc., Taichung (TW)

( * ) Notice: Subject to any disclaimer, the term of this patent is extended or adjusted under 35 U.S.C. 154(b) by 43 days.

(21) Appl. No.: 12/402,669

(22) Filed: Mar. 12, 2009

(65) Prior Publication Data
US 2009/0273847 A1    Nov. 5, 2009

(30) Foreign Application Priority Data

Apr. 30, 2008 (TW) ................. 97115917 A

(51) Int. Cl.
*G02B 7/02* (2006.01)
*G02B 15/02* (2006.01)
(52) U.S. Cl. ....................................... 359/819; 359/676
(58) Field of Classification Search .......... 359/676–706, 359/819–830; 396/72–88; 348/240.99–240.3, 348/335–369
See application file for complete search history.

(56) References Cited

U.S. PATENT DOCUMENTS

| | | | |
|---|---|---|---|
| 6,978,089 B2 | 12/2005 | Nomura | |
| 7,013,081 B2 | 3/2006 | Nomura | |
| 7,019,915 B2 | 3/2006 | Sakamoto | |
| 7,035,019 B2 | 4/2006 | Sakamoto | |
| 7,116,901 B2 | 10/2006 | Sakamoto | |
| 7,131,773 B2 | 11/2006 | Sakamoto | |
| 7,199,950 B2 | 4/2007 | Sasaki | |
| 7,224,536 B2 | 5/2007 | Nomura | |
| 7,265,918 B2 | 9/2007 | Sasaki | |
| 7,301,577 B2 | 11/2007 | Sakamoto | |
| 2008/0088732 A1* | 4/2008 | Lin | 348/347 |
| 2009/0195886 A1* | 8/2009 | Hankawa et al. | 359/687 |

* cited by examiner

*Primary Examiner* — Darryl J Collins
(74) *Attorney, Agent, or Firm* — Thomas Kayden

(57) ABSTRACT

The invention provides a zoom lens, including a plurality of lens groups. When the zoom lens is in operation, the plurality of lens groups are aligned on a common optic axis, and the zoom lens forms a first plane and a second plane conjugated with the first plane. To retract the zoom lens, at least one of the lens groups is rotated around an axis perpendicular to the common optical axis and toward the first plane, and at least one of the rest of the lens groups is moved toward the second plane along the common optical axis. As a result, overall length of the zoom lens is shortened when it is retracted to obtain the miniaturization.

18 Claims, 13 Drawing Sheets

ZOOM LENS

This Application claims priority of Taiwan Patent Application No. 097115917, filed on Apr. 30, 2008, the entirety of which is incorporated by reference herein.

BACKGROUND OF THE INVENTION

1. Field of the Invention

The invention relates to a zoom lens, and in particular, to zoom lens applied to miniaturized electronic devices.

2. Description of the Related Art

With technological progress, portable electronic devices, such as notebooks, mobile phones, personal digital assistances (PDAs) or portable projectors, are being integrated with optoelectronic technology. For example, a mobile phone may be integrated with optical lenses to form a camera phone. Camera phones not only require fine image quality, but also a relatively small size and low cost.

For miniaturization of lenses and low cost, aspheric lenses are usually selected for portable electronic devices with optoelectronic technology, as a preferred lens. The aspheric lenses are utilized to eliminate spherical aberration produced by spherical lenses. In addition, a single aspheric lens can replace multiple spherical lenses to compensate for aberration, and further simplify the optical design within the lenses, reducing size and weight of the lenses. However, further miniaturization of aspheric lenses has been limited, especially for lens requiring a wide zoom range.

In Japanese Patent No. 3742645, the storage length of a collapsible lens can be further shortened by shifting a portion of the zoom lens in an optical direction. Meanwhile, in Japanese Laid-Open No. 2004-341154, instead of shifting the lens groups, the cam barrel for extending the lenses is designed to be shortened.

Although methods for miniaturizing the zoom lens have been disclosed by various publications, the eccentricity of lenses when the zoom lens is in operation has not been satisfactorily dealt with. Therefore, a method for minimizing the zoom lens is required to avoid the eccentricity of lenses when the zoom lens is in operation.

BRIEF SUMMARY OF THE INVENTION

The invention provides a zoom lens, and in particular, a shortened zoom lens with characteristics of low cost, low tolerance sensitivity, short length and high resolution.

Accordingly, the zoom lens comprises a plurality of lens groups. When the lens is in operation, the plurality of lens groups are aligned on a common optic axis and the zoom lens forms a first plane and a second plane conjugated with the first plane. When retracting the zoom lens, at least one of the lens groups is rotated around an axis perpendicular to the common optical axis to be off line with the common optical axis, and toward the first plane and at least one of the rest of the lens groups is moved toward the second plane along the common optical axis.

Accordingly, another zoom lens is provided. The zoom lens comprises N lens groups, from the first lens group to the N lens group, characterized by when the zoom lens is in operation, the N lens groups are aligned on a common optical axis, and the zoom lens forms a first plane and a second plane conjugated to the first plane. When retracting the zoom lens, any of the lens groups except for the first lens group is rotated around an axis perpendicular to the common optical axis to be off line with the common optical axis, and toward the first plane, and at least one of the rest of the lens groups is moved from the first plane toward the second plane along the common optical axis.

The zoom lens comprises a seat adjacent to the second plane, a protrusion protruding from the seat toward the first plane and extending in parallel with the common optical axis, at least one rotating shaft of a frame disposed perpendicular to the common optical axis, and a gear set, with a cam, disposed on the rotating shaft. When retracting the zoom lens, the cam abuts the protrusion to rotate the lens group around the rotating shaft toward the first plane.

The zoom lens further comprises an outer frame assembled with the rotating shaft. When retracting the zoom lens, the outer frame moves toward the seat with rotation, and moves the cam to abut the protrusion.

The zoom lens further comprises an elastic member. When the lens groups are rotated around the axis perpendicular to the common axis to be off line with the common axis, the elastic member is accumulated with elastic potential energy. When the zoom lens is in operation, at least one of the lens groups is rotated to align with the common optical axis by the elastic member. Preferably, the elastic member is a torsion spring disposed on the rotating shaft and abutting the outer frame. When retracting the zoom lens, at least one of the lens groups rotates around the rotating shaft toward the first plane and the torsion spring is accumulated with elastic potential energy, such that the torsion spring releases energy to rotate the lens group to align with the common optical axis when the zoom lens is in operation.

The zoom lens further comprises a fixing tube assembled with the seat, a rotary tube disposed in the fixing tube, rotating around and moving along the common optical axis, and a straight tube inrotatably disposed in the rotary tube and moving along the common optical axis. The fixing tube comprises an inner surface with a first cam recess formed thereon, and the first cam recess is not in parallel with the common optical axis. The rotary tube is rotated and moved by the first cam recess. The rotary tube comprises an inner surface with a second cam recess formed thereon, and the second cam recess is not in parallel with the common optical axis.

The outer frame of the zoom lens further comprises a cam latch gearing with the second cam recess and the third cam recess simultaneously, allowing the outer frame to move between the first plane and the second plane with rotation.

The zoom lens further comprises a motor driving the rotary tube to rotate and move.

In the zoom lens, at least one of the lens groups is rotated around the rotating shaft toward the first plane, and an optical axis thereof is perpendicular to the common optical axis.

Compared to the conventional design, the zoom lens of the invention minimizes its length by rotating at least one of the lens groups toward the first plane when it is retracted, successfully achieving miniaturization.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

Figure 1A:
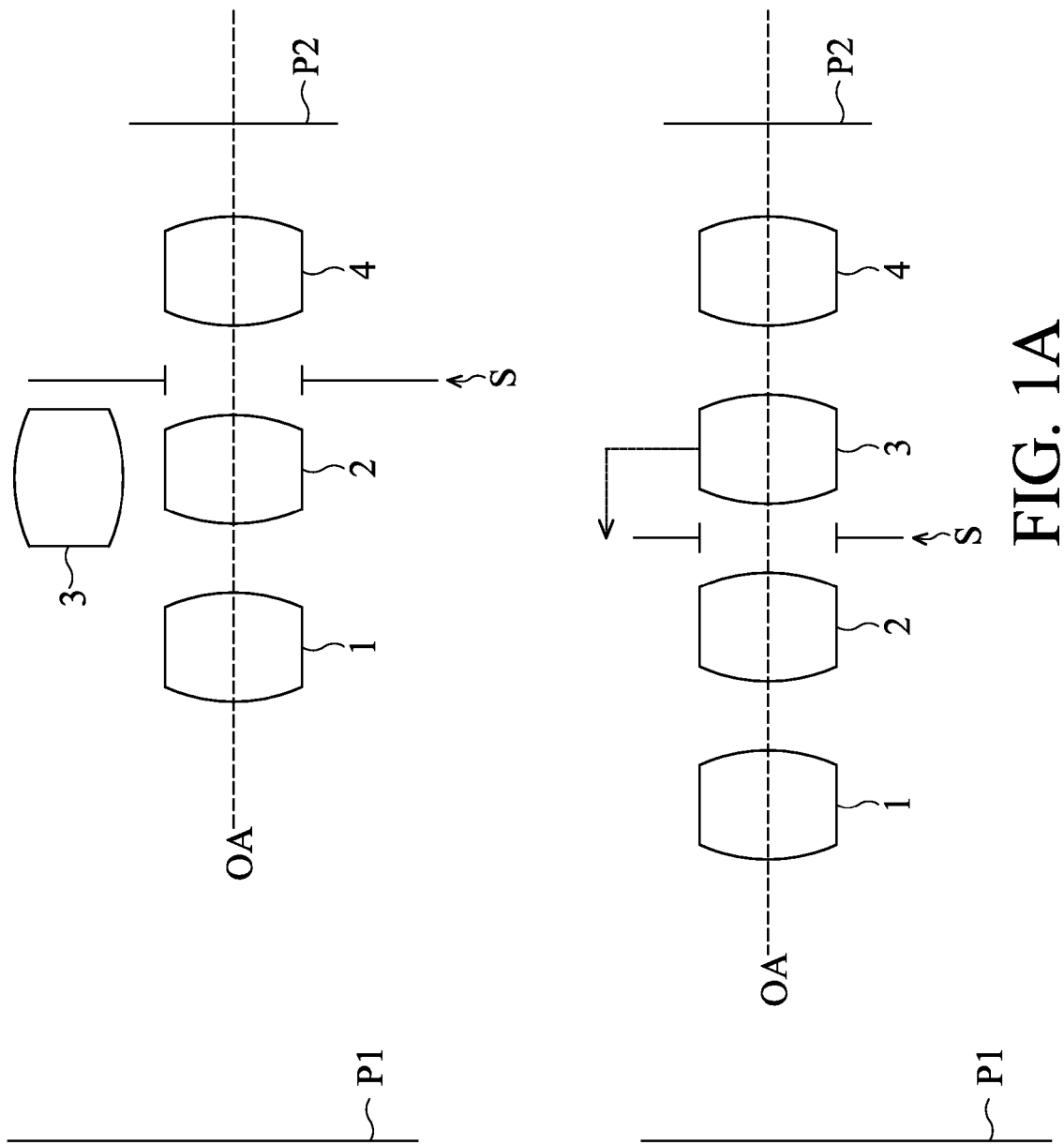
FIGS. 1A and 1B are schematic views of a zoom lens of the invention showing an extended status and a retracted status, respectively.
Figure 1B:
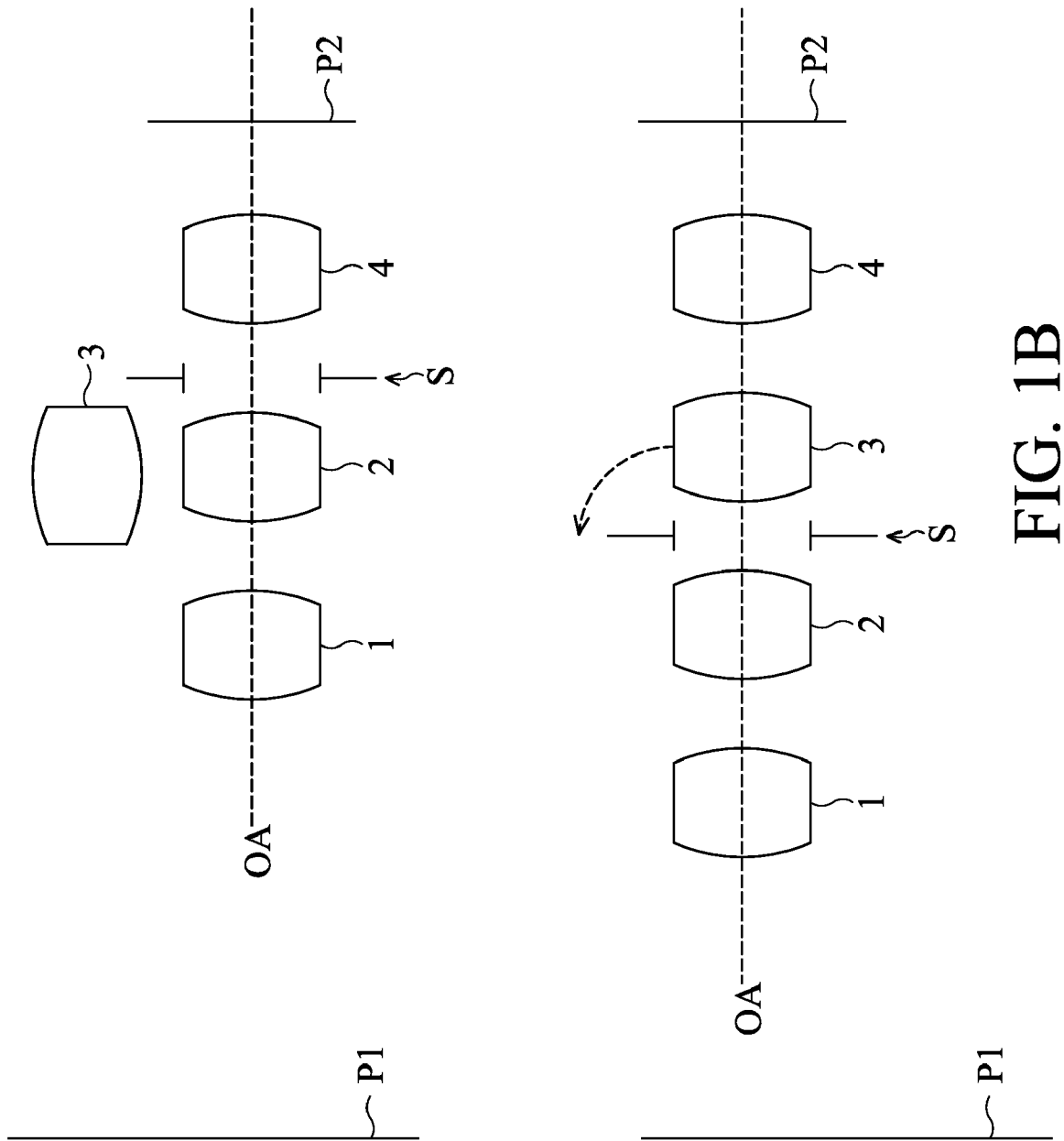

FIGS. 1A and 1B are schematic views of a zoom lens of the invention showing an extended status and a retracted status, respectively. As shown in FIGS. 1A and 1B, the zoom lens comprises four lens groups as arranged as follows: a first lens group 1, a second lens group 2, an aperture diaphragm S, a third lens group 3 and a fourth lens group 4. When the zoom lens is in operation, the lens groups are aligned on a common optical axis OA, and the zoom lens forms a first plane P1 and a second P2 conjugated with the first plane P1. For example, when the zoom lens is applied to a camera, the first plane P1 corresponds to an object side while the second plane P2 corresponds to an image side. When the zoom lens is applied to a projector, the first plane P1 corresponds to a magnifying side while the second plane P2 corresponds to a reduction side. When the zoom lens is in operation, at least one of the lens groups move along the common optical axis OA.

When retracting the zoom lens, at least one of the lens groups rotates around an axis perpendicular to the common optical axis OA and toward the first plane P1, at least one of the rest of the lens groups moves in a direction parallel to the common optical axis OA from the first plane P1 toward the second plane P2. Referring to FIG. 1A, the third lens group 3 first moves off line with the common optical axis OA, then rotates around an axis perpendicular to the common optical axis OA, and finally moves toward the first plane P1. Otherwise, referring to FIG. 1B, the third lens group 3 directly rotates around an axis perpendicular to the common optical axis OA, and moves simultaneously toward the first plane P1.

Referring to FIGS. 1A and 1B, when the zoom lens of the embodiment is retracted, the third lens group 3 has been rotated off line with the common optical axis OA and moved toward the first plane P1, such that the first lens group 1, the second lens group 2 and the aperture diaphragm S are able to move toward the second plane P2, allowing the second lens group 2 and the fourth lens group 4 to be adjacent to each other. As a result, the length of the retracted zoom lens is significantly reduced.

Figure 2:
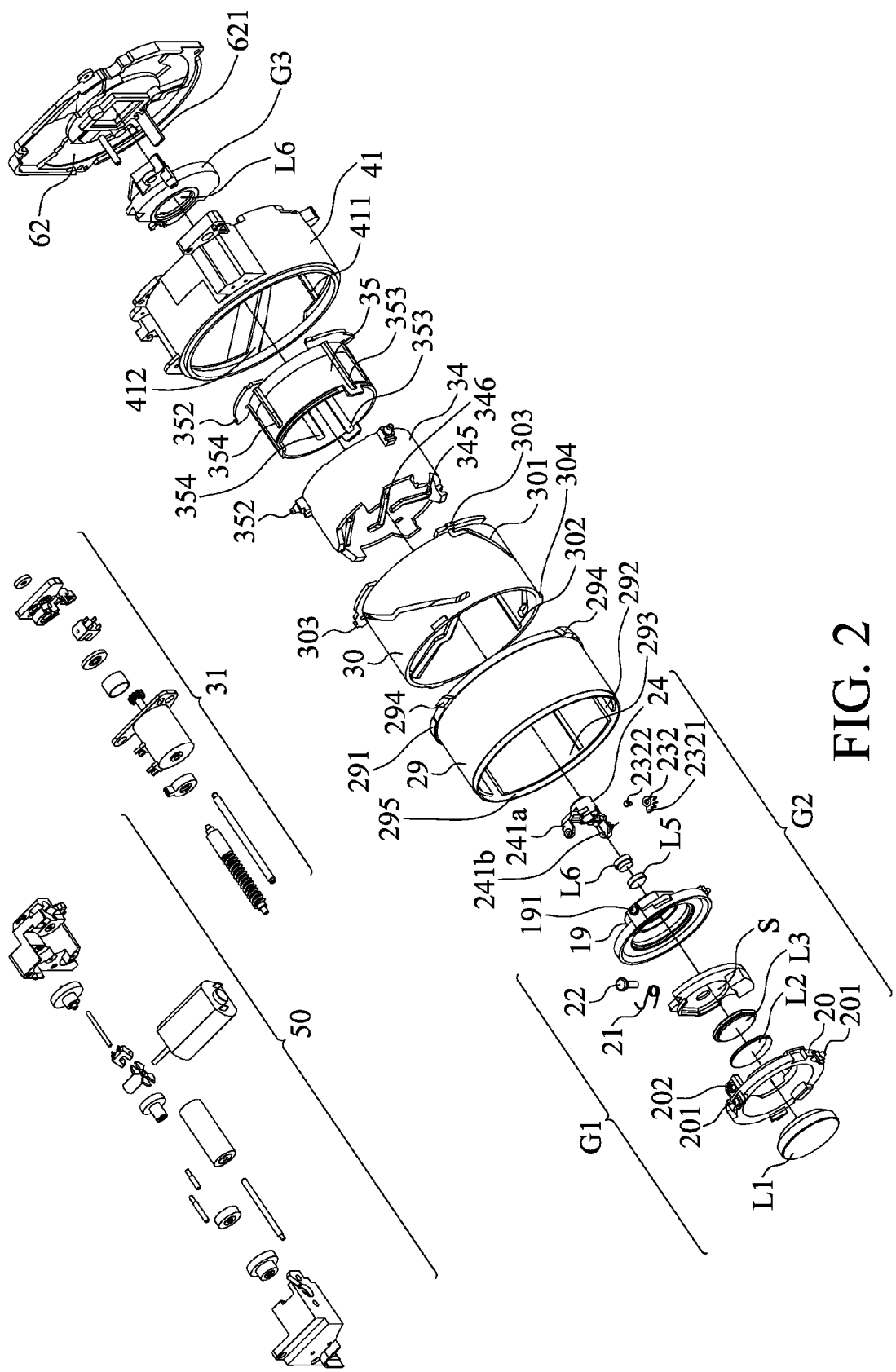
FIG. 2 is an exploded view of the zoom lens of an embodiment of the invention.

FIG. 2 is an exploded view of the zoom lens of an embodiment of the invention. Referring to FIG. 2, the zoom lens comprises a first lens group G1, a second lens group G2, a third lens group G3, a seat 62, a fixing tube 41, a first straight tube 30, a first rotary tube 29, a second straight tube 35 and a second rotary tube 34. The aperture diaphragm S is disposed between the first lens group G1 and the second lens group G2. The first lens group G1 comprises a first lens L1, a second lens L2, a third lens L3 and a first frame 19, wherein the first lens L1, the second lens L2 and the third lens 13 are accommodated and fixed in the first frame 19. The first frame 19 comprises a first cam latch 191 on an outer periphery thereof.

The second lens group G2 comprises a first lens L4, a fifth lens L5, a second frame 24, a second outer frame 20, a torsion spring 21, a rotating latch shaft 22 and a gear set 23. The fourth lens L4 and the fifth lens L5 are accommodated and fixed in the second frame 24. The second frame 24 comprises a pair of support arms 241a, 241b. When the second frame 24 is involved in the operation, the pair of support arms 241a, 241b are substantially parallel to the common optical axis OA. The second outer frame 20 comprises a second cam latch 201, a shaft hole 202 and a fixing arm 203. The rotating latch shaft 22 passes through the shaft hole 202 and the torsion spring 21 and is fixed to one of the support arms 241a. In the embodiment, the other support arm 241b connects with the second outer frame 20 in the same fashion of the connection between the outer frame 20 and the support arm 241a, allowing the second frame 24 to rotate around the axis perpendicular to the common optical axis OA by the rotating latch shaft 22. The gear set 23 comprises a first sector gear 231 and a second sector gear 232, wherein the second sector gear 232 comprises a cam 2321. The first sector gear 231 is fixed on the support arm 241b and the second sector gear 232 is rotatably disposed on the fixing arm 203 by a latch 2322, allowing the first sector gear 231 to gear with the second sector gear 232.

The third lens group G3 comprises a sixth lens L6 and a first driving module 31. Driven by the driving module 31, the sixth lens L6 moves along the common optical axis OA to adjust the focus.

The seat 62 comprises a protrusion 621 extending in parallel with the common optical axis OA. The fixing tube 41 is assembled with the seat 62. The fixing tube 41 comprises a first cam recess 411, formed on an inner surface of the fixing tube 41, in parallel with the common optical axis OA and a second cam recess 412 not in parallel with the common optical axis OA. The first rotary tube 29 comprises a gear 291 disposed on a periphery, adjacent to the seat 62, of an outer surface of the first rotary tube 29, and a third cam recess 292 and a fourth cam recess 293, formed on an inner surface of the first rotary tube 29, in parallel with the common optical axis OA. Additionally, a third cam latch 294, disposed on the periphery, adjacent to the seat 62, of the outer surface of the first rotary tube 29 gears with the second cam recess 293, allowing the first rotary tube 29 to rotate around and move along the common optical axis OA within the fixing tube 41.

The first straight tube 30 comprises a fifth cam recess 301, formed on an inner surface of the first straight tube 30, not in parallel with the common optical axis OA and a sixth cam recess 302, formed on the inner surface of the first straight tube 30, in parallel with the common optical axis OA. The first straight tube 30 comprises a fourth cam latch 303 disposed on a periphery, adjacent to the seat 62, of an outer surface of the first straight tube 30 and a fifth cam latch 304, disposed on a periphery, away from the seat 62, of the outer surface of the first straight tube 30. The fifth cam latch 304 gears with the third cam recess 292 and then engages with a periphery 295, away from the seat 62, of an inner surface of the first rotary tube 29. The fourth cam latch 303 gears with the first cam recess 411 of the fixing tube 41. Therefore, when the first rotary tube 29 rotates around and moves along the common optical axis OA within the fixing tube 41, the first rotary tube 29 moves the first straight tube 30 along the common optical axis OA.

The second rotary tube 34 comprises a seventh cam recess 345 and an eighth cam recess 346, formed on an inner surface of the second rotary tube 34, not in parallel with the common optical axis OA. The second rotary tube 34 further comprises a sixth cam latch 341 disposed on a periphery, adjacent to the seat 62, of an outer surface of the second rotary tube 34. The fifth cam recess 301, a groove, allows the sixth cam latch 341 to pass therethrough and to gear with the fourth cam recess 293. Therefore, when the first rotary tube 29 rotates around the common optical axis OA, the second rotary tube 34 is driven to rotate around the common optical axis OA.

The second straight tube 35 comprises a ninth cam recess 353 and a tenth cam recess 354, formed on an inner surface of the second straight tube 35, in parallel with the common optical axis OA. The second straight tube 35 further comprises a seventh cam latch 352 disposed on a periphery, adjacent to the seat 62, of an outer surface of the second straight tube 35. The seventh cam latch 352 gears with the sixth cam recess 302, such that when the first straight tube 30 move along the common optical axis OA, the second straight tube 35 is driven to move along the common optical axis OA.

The ninth cam recess 353, a groove, allows the first cam latch 191 of the first frame 19 to pass therethrough and to gear with the seventh cam recess 345. The tenth cam recess, a groove, allows the second cam latch 201 of the second outer frame 20 to pass therethrough and to gear with the eighth cam recess 346.

When the zoom lens is in operation, the first rotary tube 29 drives the second rotary tube 34 to rotate around the common optical axis OA, and the first lens group G1 is moved along the common optical axis OA by the first cam shaft 191, the ninth cam recess 353 and the seventh cam recess 345, and the second lens group G2 is moved along the common optical axis OA by the second cam latch 201, the tenth cam recess 354 and the eighth cam recess 346.

The second driving module 50, disposed on the outer surface of the fixing tube 41, gears with the gear 291 of the first rotary 29. When the zoom lens is in operation, the second driving module 50 drives the first rotary 29 to rotate around the common optical axis OA.

Figure 3:
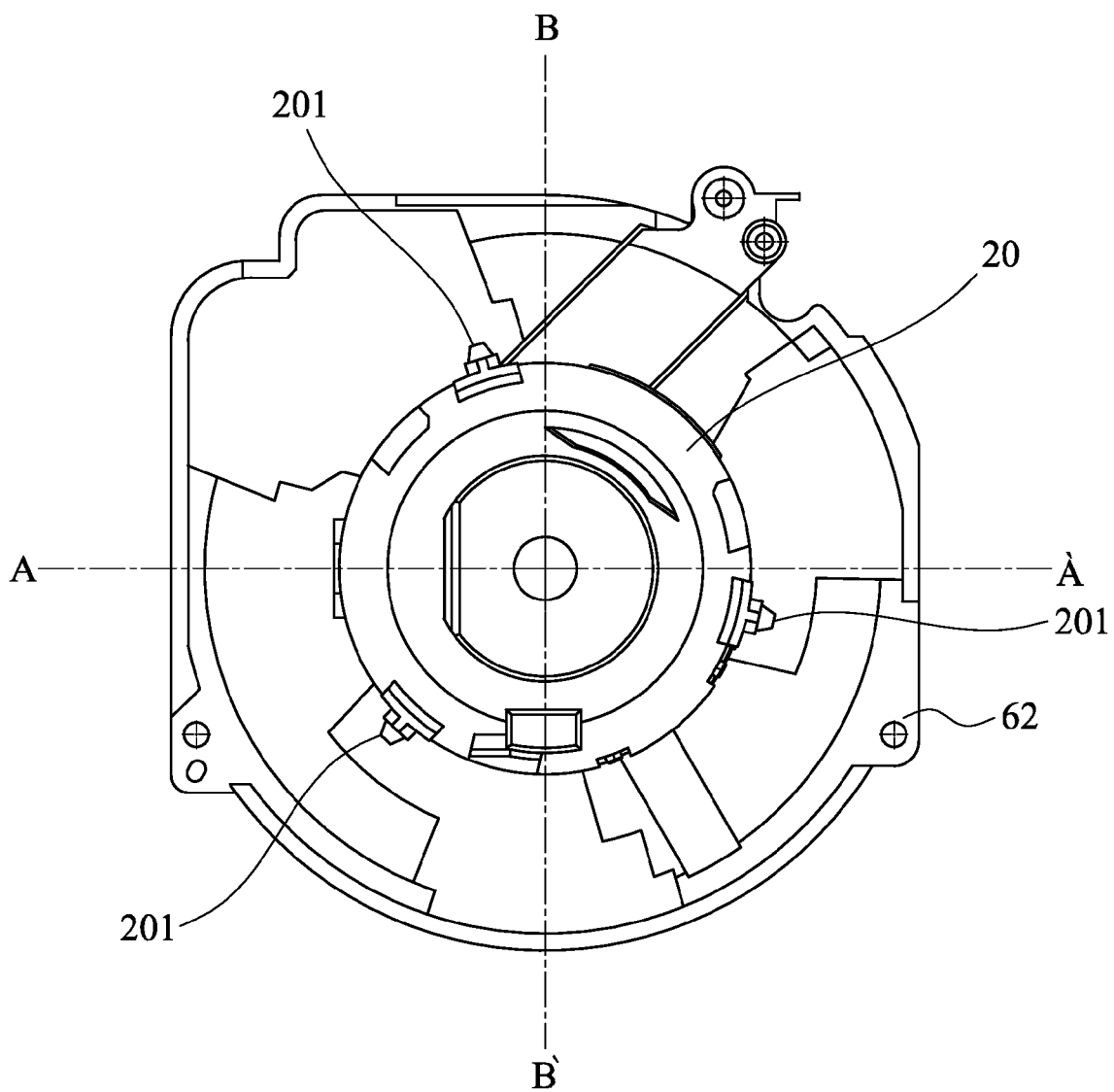
FIG. 3 is a schematic view of the zoom lens viewed from a first plane to the second plane, wherein the zoom lens of the embodiment is held with a seat, a second lens group and an aperture diaphragm.

FIG. 3 is a schematic view of the zoom lens viewed from a first plane to the second plane, wherein the zoom lens of the embodiment is held with the seat, the second lens group and the aperture diaphragm.

Figure 4A:
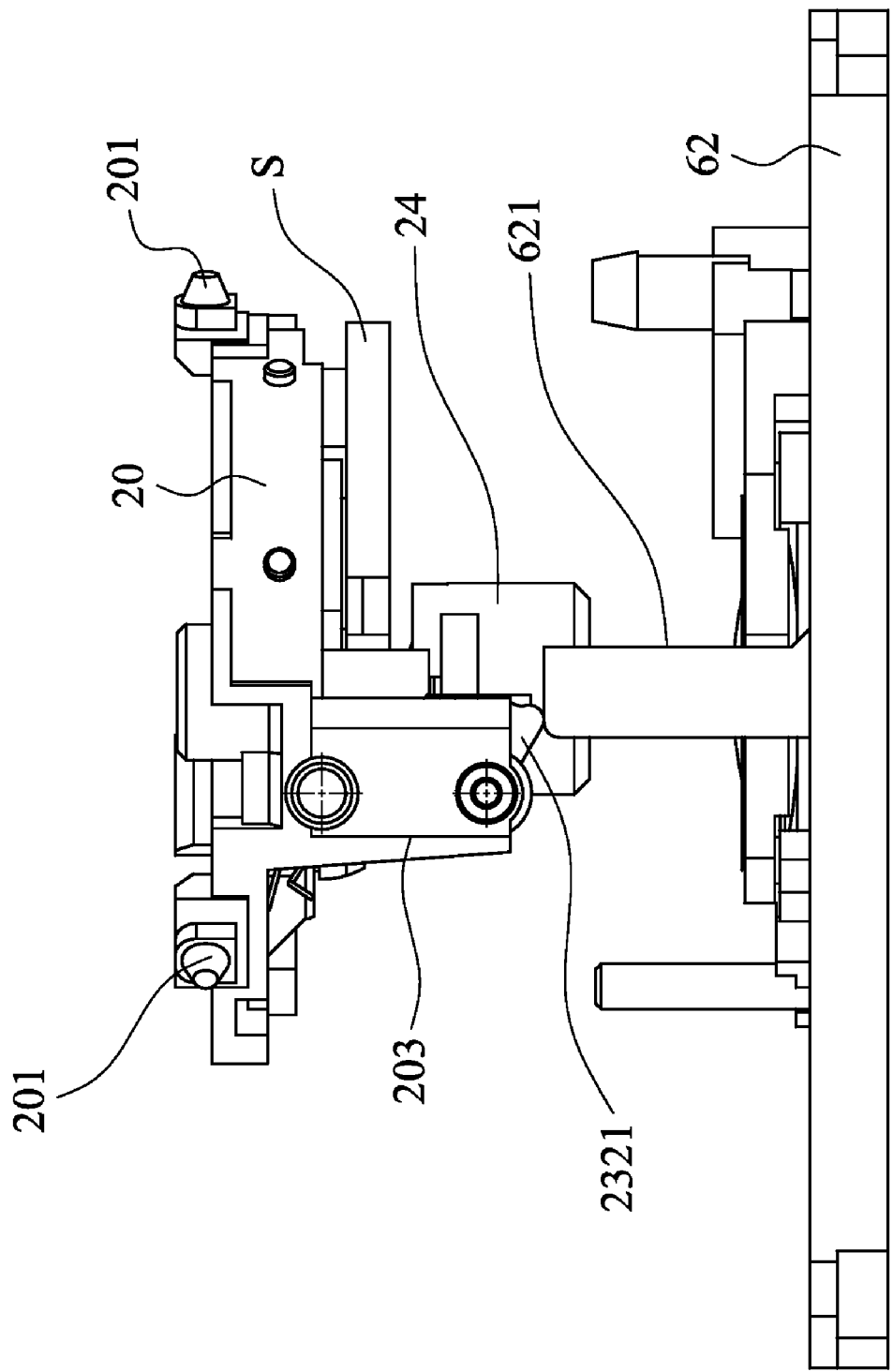
FIG. 4A is a sectional view from line A-A' of FIG. 3, and it is viewed from B' to B to show the zoom lens before retraction.
Figure 4B:
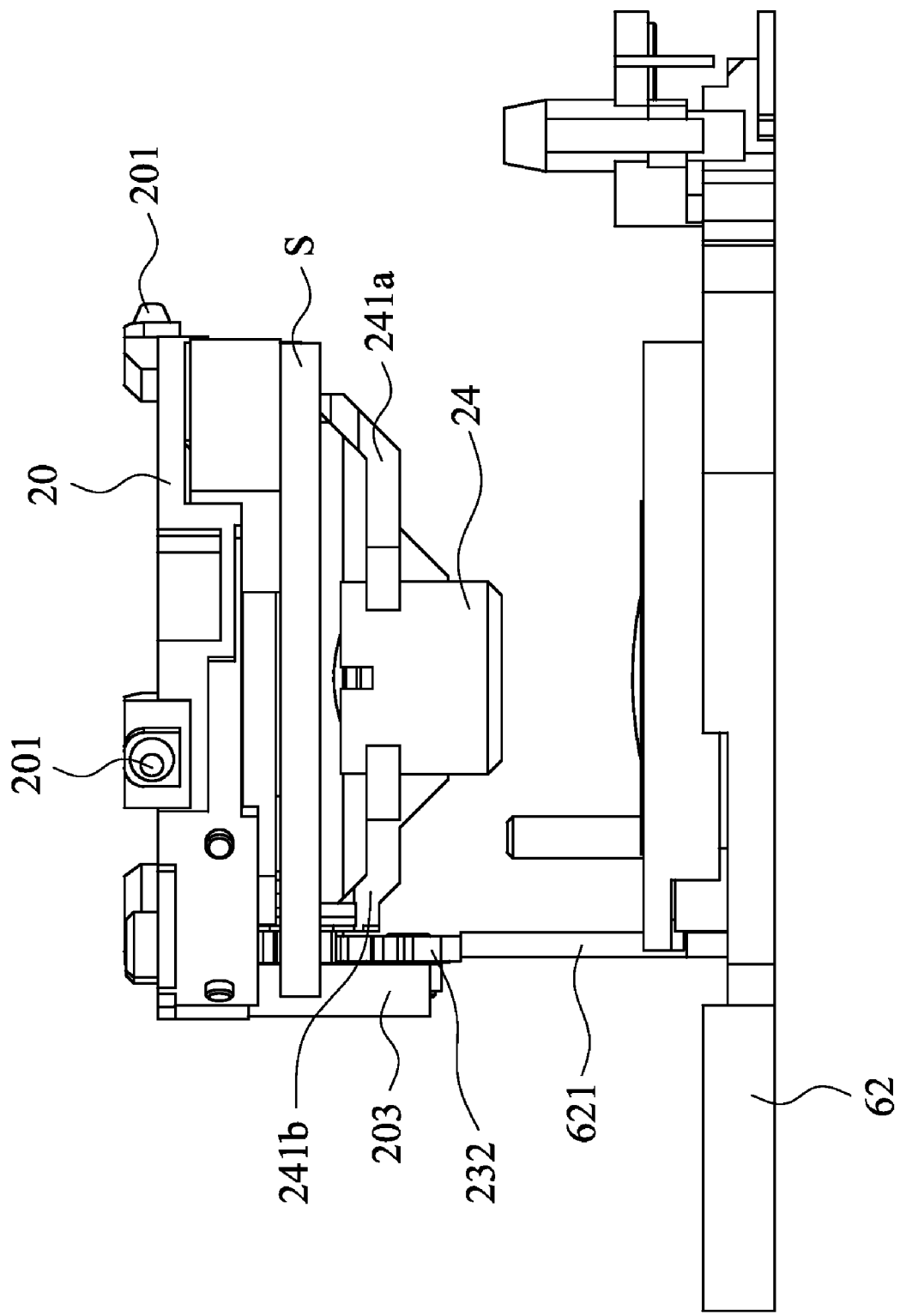
FIG. 4B is a sectional view from line B-B' of FIG. 3, and it is viewed from A' to A to show the zoom lens before retraction.
Figure 4C:
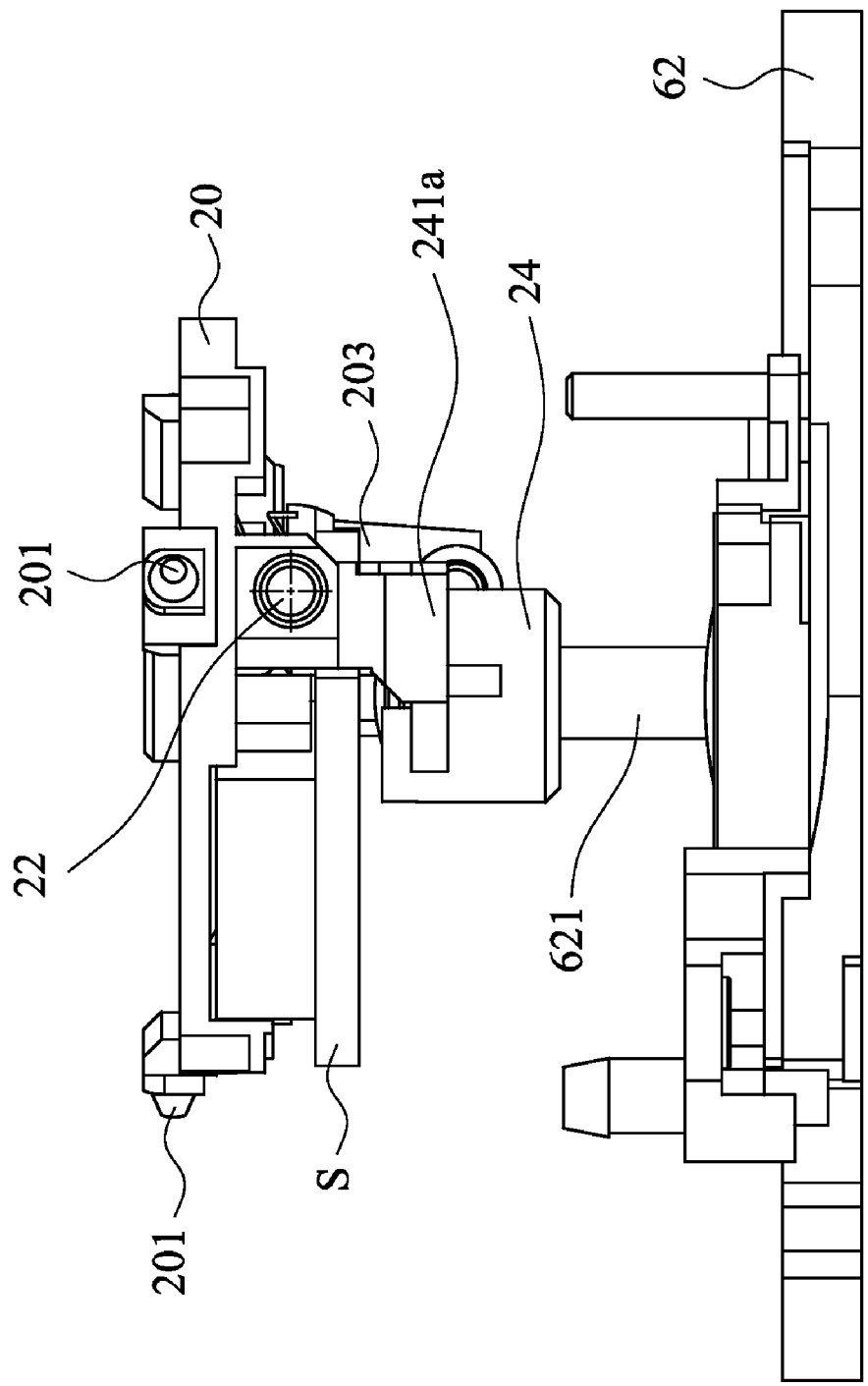
FIG. 4C is a sectional view from line A-A' of FIG. 3, and it is viewed from B to B' to show the zoom lens before retraction.

FIG. 4A is a sectional view from line A-A' of FIG. 3, and it is viewed from B' to B to show the zoom lens before retraction. FIG. 4B is a sectional view from line B-B' of FIG. 3, and it is viewed from A' to A to show the zoom lens before retraction. FIG. 4C is a sectional view from line A-A' of FIG. 3, and it is viewed from B to B' to show the zoom lens before retraction. Referring to FIGS. 4A-4C, before retraction of the zoom lens of the embodiment, the cam 2321 of the second sector gear 232 of gear set 23 abuts the protrusion 621 of the seat 62.

Figure 5A:
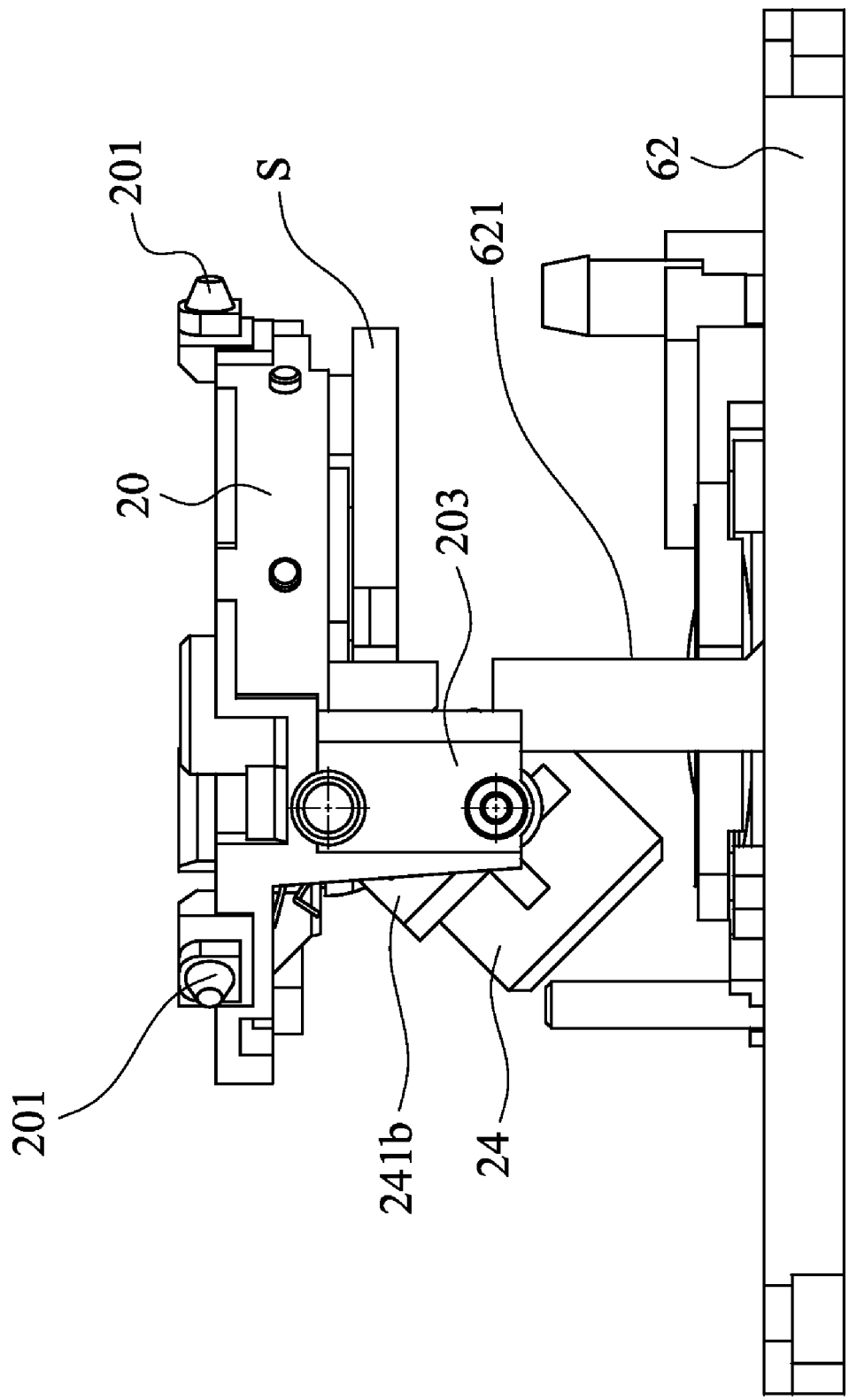
FIG. 5A is a sectional view from line A-A' of FIG. 3, and it is viewed from B' to B to show the zoom lens being retracted.
Figure 5B:
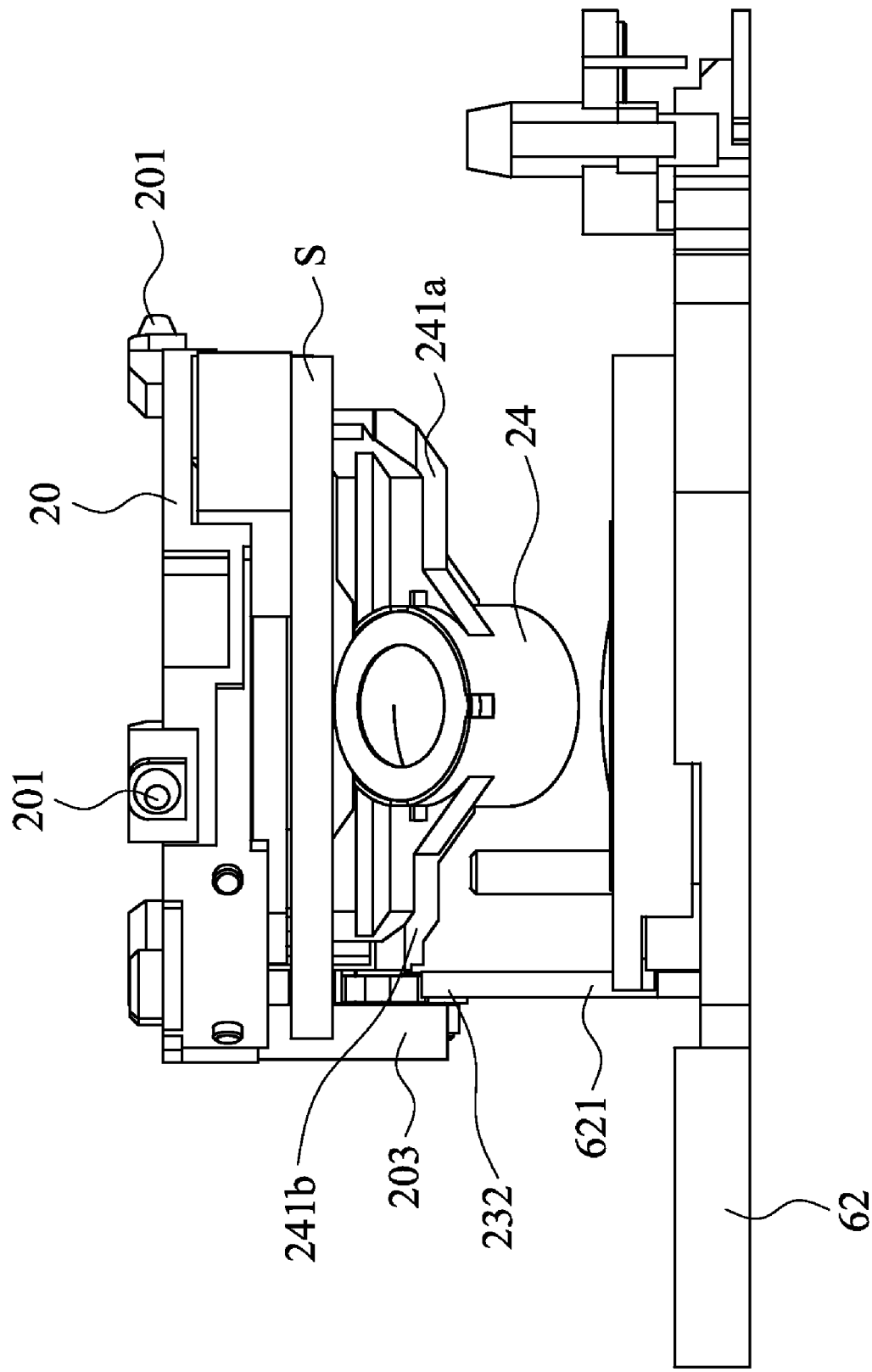
FIG. 5B is a sectional view from line B-B' of FIG. 3, and it is viewed from A' to A to show the zoom lens being retracted.
Figure 5C:
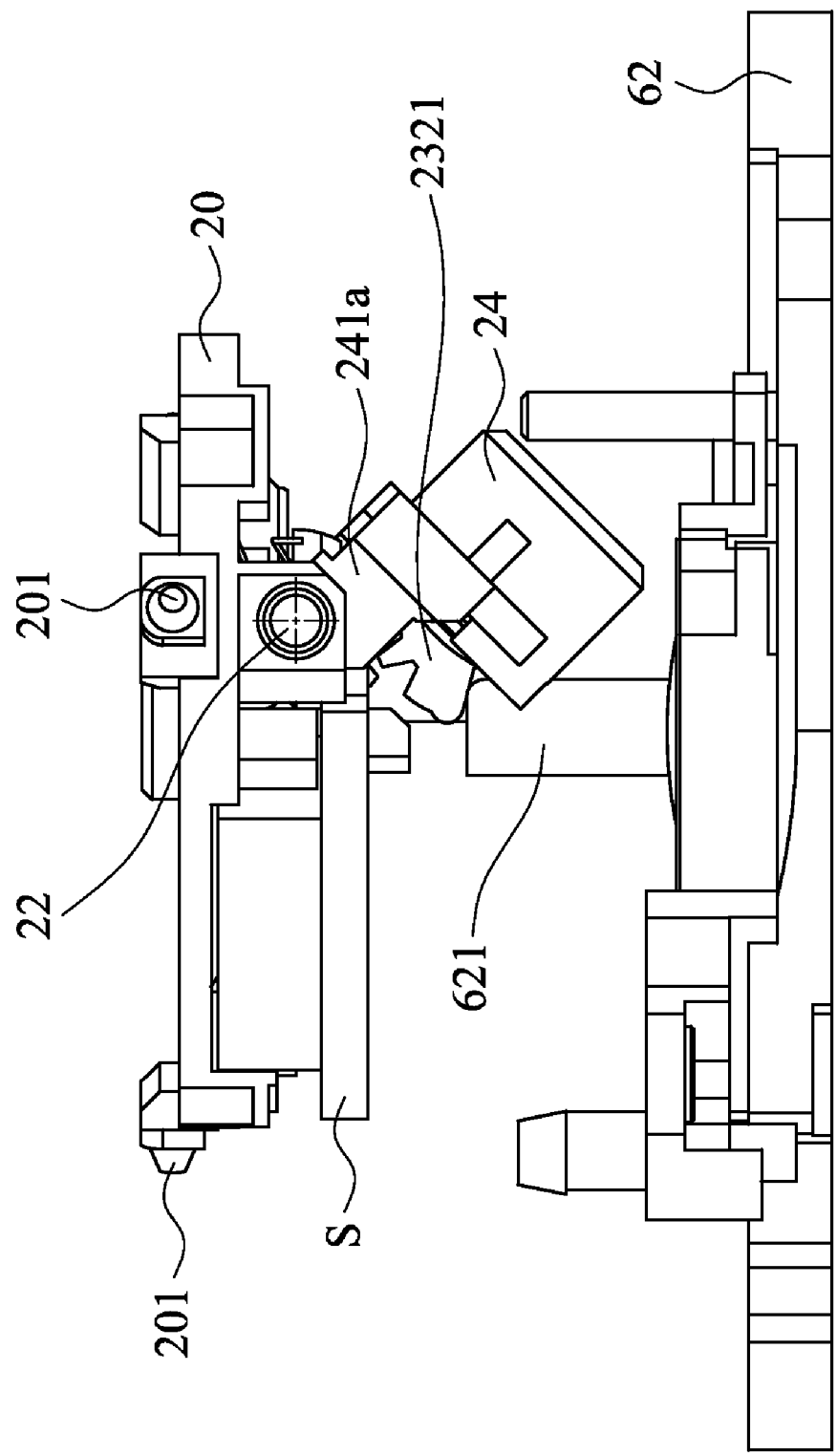
FIG. 5C is a sectional view from line A-A' of FIG. 3, and it is viewed from B to B' to show the zoom lens being retracted.

FIG. 5A is a sectional view from line A-A' of FIG. 3, and it is viewed from B' to B to show the zoom lens being retracted. FIG. 5B is a sectional view from line B-B' of FIG. 3, and it is viewed from A' to A to show the zoom lens being retracted. FIG. 5C is a sectional view from line A-A' of FIG. 3, and it is viewed from B to B' to show the zoom lens being retracted. Referring to FIGS. 5A-5C, when retracting the zoom lens of the embodiment, the cam 2321 of the second sector gear 232 of gear set 23 abuts the protrusion 621 of the seat 62, allowing the second sector gear 232 to rotate the second frame 24 around the rotating latch shaft 22 toward the first plane.

Figure 6A:
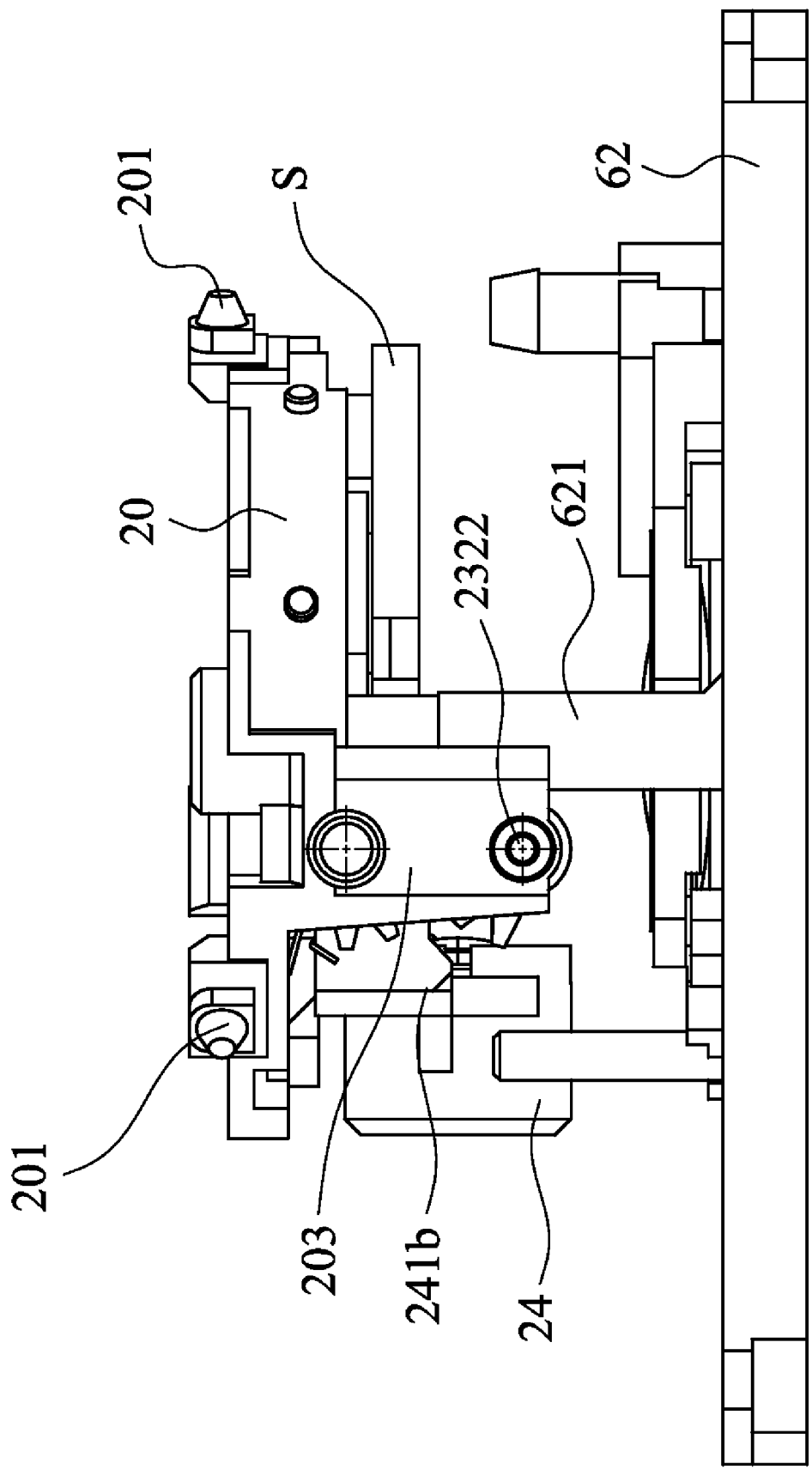
FIG. 6A is a sectional view from line A-A' of FIG. 3, and it is viewed from B' to B to show the zoom lens after retraction.
Figure 6B:
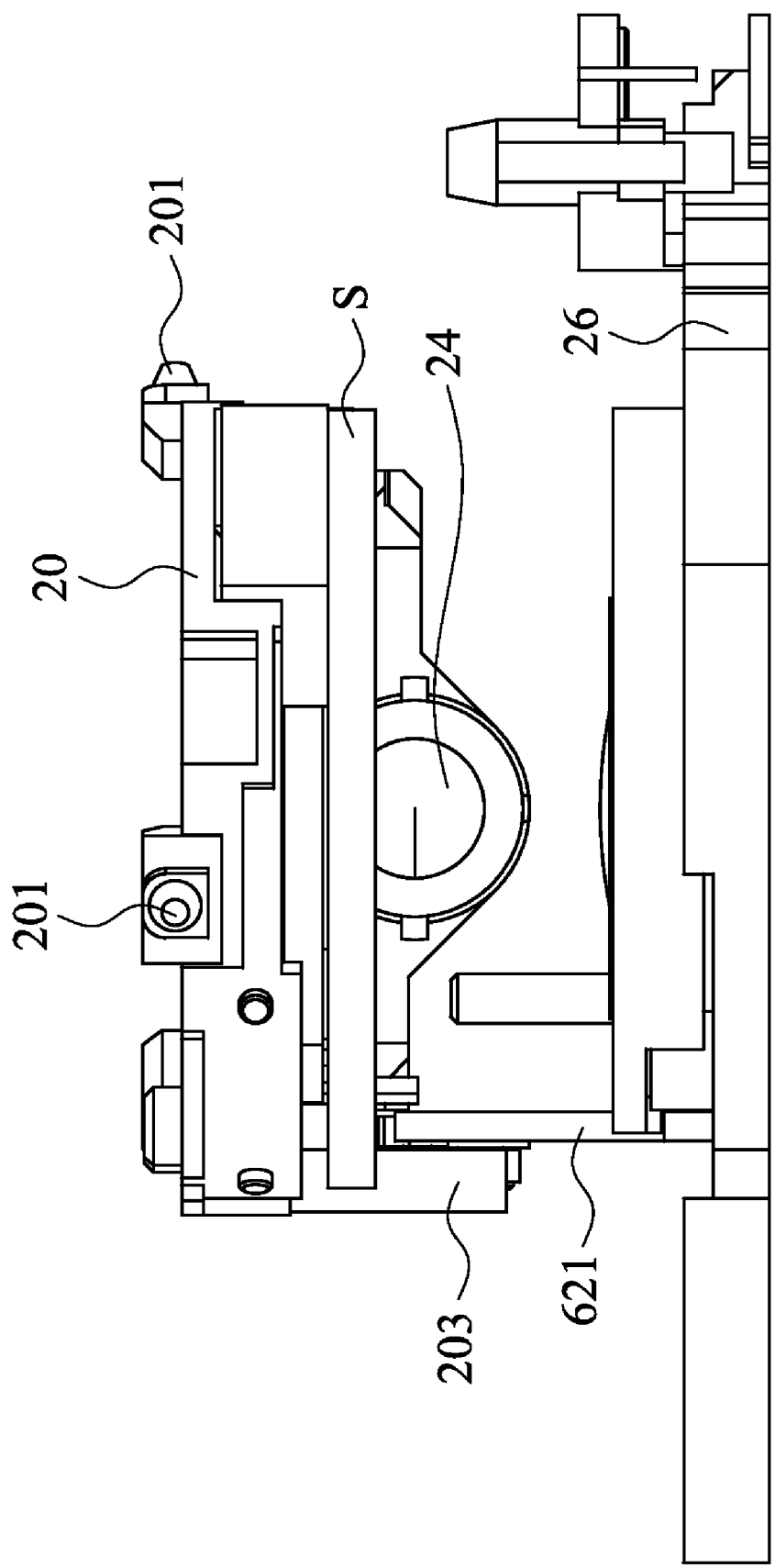
FIG. 6B is a sectional view from line B-B' of FIG. 3, and it is viewed from A' to A to show the zoom lens after retraction.
Figure 6C:
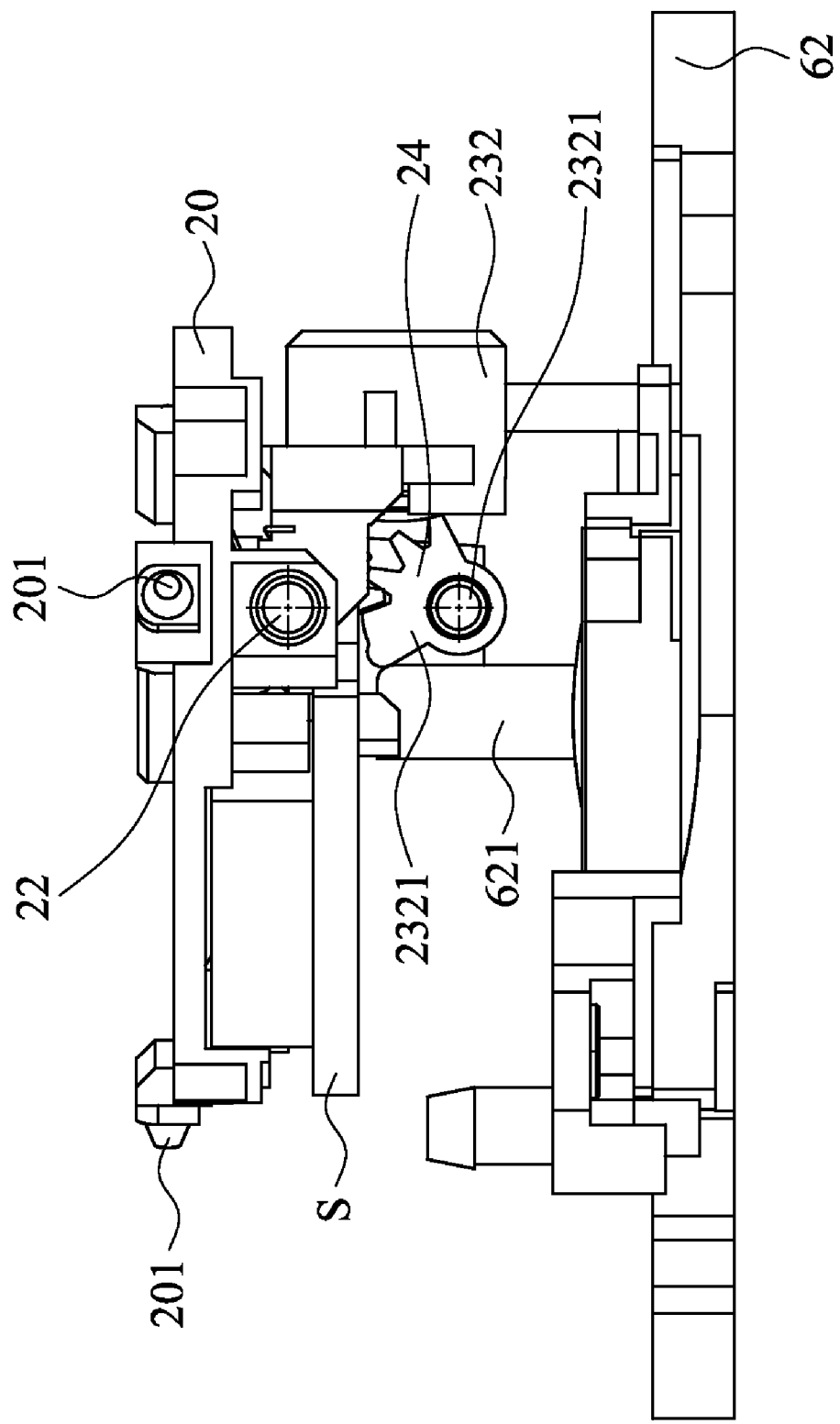
FIG. 6C is a sectional view from line A-A' of FIG. 3, and it is viewed from B to B' to show the zoom lens after retraction.

FIG. 6A is a sectional view from line A-A' of FIG. 3, and it is viewed from B' to B to show the zoom lens after retraction. FIG. 6B is a sectional view from line B-B' of FIG. 3, and it is viewed from A' to A to show the zoom lens after retraction. FIG. 6C is a sectional view from line A-A' of FIG. 3, and it is viewed from B to B' to show the zoom lens after retraction. Referring to FIGS. 6A-6C, when the zoom lens of the embodiment has been retracted, the second frame 24 has been rotated off line with the common optical axis. The optical axis of the second frame 24 is substantially perpendicular to the common optical axis.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A zoom lens, comprising:
a plurality of lens groups, wherein when the zoom lens is in operation, the plurality of lens groups are aligned on a common optic axis, and the zoom lens forms a first plane and a second plane conjugated with the first plane, and when retracting the zoom lens, at least one of the lens groups is rotated around an axis perpendicular to the common optical axis and toward the first plane to be off line with the common optical axis, and at least one of the rest of the lens groups is moved toward the second plane along the common optical axis;
a seat adjacent to the second plane, comprising a protrusion protruding from the seat toward the first plane, and extending in parallel with the common optical axis;
a frame supporting at least one of the lens groups;
a rotating shaft movably disposed on the frame and perpendicular to the common optical axis; and
a gear set disposed on the rotating shaft and comprising a cam, wherein when retracting the zoom lens, the cam abuts the protrusion to rotate at least one of the lens groups around the rotating shaft toward the first plane.

2. The zoom lens as claimed in claim 1, further comprising:
an outer frame assembled with the rotating shaft, wherein when retracting the zoom lens, the outer frame moves toward the seat without rotation, and moves the cam to abut the protrusion.

3. The zoom lens as claimed in claim 1, wherein when the at least one of the lens groups is rotated, an optical axis thereof is perpendicular to the common optical axis.

4. The zoom lens as claimed in claim 1, further comprising:
an elastic member disposed on the rotating shaft, wherein when the zoom lens is in operation, the elastic member rotates at least one of the lens group to align with the common optical axis.

5. The zoom lens as claimed in claim 4, further comprising:
an outer frame assembled with the rotating shaft, wherein when retracting the zoom lens, the outer frame moves toward the seat without rotation, and moves the cam to abut the protrusion.

6. The zoom lens as claimed in claim 5, wherein the elastic member is a torsion spring abutting the outer frame.

7. The zoom lens as claimed in claim 5, further comprising:
a fixing tube assembled with the seat and comprising an inner surface with a first cam recess not in parallel with the common optical axis;
a rotary tube disposed in the fixing tube, rotating around and moving along the common optical axis by the first cam recess, and comprising an inner surface with a second cam recess not in parallel with the common optical axis;
a straight tube inrotatably disposed in the rotary tube, moving along the common optical axis by the rotary tube, and comprising an inner surface with a third cam recess in parallel with the common optical axis.

8. The zoom lens as claimed in claim 7, wherein the outer frame comprises a cam latch gearing with the second cam recess and the third cam recess simultaneously, allowing the outer frame to move between the first plane and the second plane without rotation.

9. The zoom lens as claimed in claim 7, further comprising a motor driving the rotary tube to rotate and move.

10. A zoom lens comprising:
N lens groups, from the first lens group to the N lens group, characterized in that when the zoom lens is in operation, the N lens groups are aligned on a common optical axis, and the zoom lens forms a first plane and a second plane conjugated to the first plane, and when retracting the zoom lens, any of the lens groups except for the first lens group is rotated around an axis perpendicular to the common optical axis and toward the first plane to be off line with the common optical axis, and at least one of the rest of the lens groups is moved from the first plane toward the second plane along the common optical axis;
a seat adjacent to the second plane, comprising a protrusion protruding from the seat toward the first plane, and extending in parallel with the common optical axis;
a frame supporting at least one of the lens groups;
a rotating shaft movably disposed on the frame and perpendicular to the common optical axis; and
a gear set disposed on the rotating shaft and comprising a cam, wherein when retracting the zoom lens, the cam abuts the protrusion to rotate at least one of the lens groups around the rotating shaft toward the first plane.

11. The zoom lens as claimed in claim 10, further comprising:
an outer frame assembled with the rotating shaft, wherein when retracting the zoom lens, the outer frame moves toward the seat without rotation, and moves the cam to abut the protrusion.

12. The zoom lens as claimed in claim 10, wherein when any one of the lens groups except for the first lens group is rotated, an optical axis thereof is perpendicular to the common optical axis.

13. The zoom lens as claimed in claim 10, further comprising:
an elastic member disposed on the rotating shaft, wherein when the zoom lens is in operation, the elastic member rotates at least one of the lens group on the common optical axis.

14. The zoom lens as claimed in claim 13, further comprising:
an outer frame assembled with the rotating shaft, wherein when retracting the zoom lens, the outer frame moves toward the seat without rotation, and moves the cam to abut the protrusion.

15. The zoom lens as claimed in claim 14, wherein the elastic member is a torsion spring abutting the outer frame.

16. The zoom lens as claimed in claim 14, further comprising:
a fixing tube assembled with the seat and comprising an inner surface with a first cam recess not in parallel with the common optical axis;
a rotary tube disposed in the fixing tube, rotating around and moving along the common optical axis by the first cam recess, and comprising an inner surface with a second cam recess not in parallel with the common optical axis;
a straight tube inrotatably disposed in the rotary tube, moving along the common optical axis by the rotary tube, and comprising an inner surface with a third cam recess.

17. The zoom lens as claimed in claim 16, wherein the outer frame comprises a cam latch gearing with the second cam recess and the third cam recess simultaneously, allowing the outer frame to move between the first plane and the second plane without rotation.

18. The zoom lens as claimed in claim 16, further comprising a motor driving the rotary tube to rotate and move.

* * * * *